US007484859B1

(12) United States Patent
Burke

(10) Patent No.: US 7,484,859 B1
(45) Date of Patent: Feb. 3, 2009

(54) DUSTBIN APPARATUS

(76) Inventor: Paula J. Burke, 1507 E. 63rd St., Sioux Falls, SD (US) 57108

( * ) Notice: Subject to any disclaimer, the term of this patent is extended or adjusted under 35 U.S.C. 154(b) by 64 days.

(21) Appl. No.: 11/624,318

(22) Filed: Jan. 18, 2007

(51) Int. Cl.
*B25B 23/18* (2006.01)
*F21V 33/00* (2006.01)
*A01K 29/00* (2006.01)
*A47L 13/52* (2006.01)

(52) U.S. Cl. ........................ 362/120; 362/109; 362/155; 362/253; 294/1.4; 294/1.5; 15/257.1; 15/257.2

(58) Field of Classification Search ................. 362/109, 362/253, 155, 120; 294/1.4, 1.5; 15/257.1, 15/257.2
See application file for complete search history.

(56) References Cited

U.S. PATENT DOCUMENTS 2,132,007 A 10/1938 Smith
4,209,870 A 7/1980 Doyel
5,107,565 A 4/1992 Chun
5,540,469 A * 7/1996 Albert ........................ 294/1.4
5,540,470 A * 7/1996 Lu ........................ 294/1.4
5,896,618 A 4/1999 Woo et al.
6,023,812 A 2/2000 Morad
6,052,860 A 4/2000 Coxsey
6,145,553 A 11/2000 Sofy
6,256,833 B1 7/2001 Steinberg
6,666,372 B1 12/2003 Nagel
2004/0221872 A1 11/2004 Perelli et al.
2005/0071943 A1 4/2005 Liu
2006/0180233 A1* 8/2006 Perkitny ...................... 141/10

* cited by examiner

*Primary Examiner*—Sandra L O'Shea
*Assistant Examiner*—Sean P Gramling

(57) ABSTRACT

A dustbin apparatus includes a housing that has a bottom wall, a top wall and a peripheral wall that is attached to and extends between the top and bottom walls. The peripheral wall has an opening therein extending upwardly from the bottom wall and toward the top wall. The opening defines a front side of the housing. Debris may be swept into the housing through the opening. An elongated handle has a first end and a second end. The first end is pivotally coupled to an outer surface of the top wall. A primary light emitter is attached to the housing and emits light forward of the front side of the housing when turned on to illuminate an area forward and adjacent to the bottom wall.

10 Claims, 3 Drawing Sheets

DUSTBIN APPARATUS

BACKGROUND OF THE INVENTION

1. Field of the Invention

The present invention relates to dustbin devices and more particularly pertains to a new dustbin device for illuminating an area in front of a dustbin to allow a person sweeping debris to more easily view the debris and the area adjacent to the dustbin.

2. Description of the Prior Art

The use of dustbin devices is known in the prior art. While these devices fulfill their respective, particular objectives and requirements, the need remains for a device that allows a person to see the area around, and in particular in front of, a dustbin to ensure that any debris in an area local to the dustbin is readily viewable. Such a device would be of particular usefulness to bar and nightclub personnel who must often sweep up broken glass in areas of limited visibility. The device may also include secondary lighting means which is removable from the device to be used as a conventional flashlight when needed.

SUMMARY OF THE INVENTION

The present invention meets the needs presented above by generally comprising a housing that has a bottom wall, a top wall and a peripheral wall that is attached to and extends between the top and bottom walls. The peripheral wall has an opening therein extending upwardly from the bottom wall and toward the top wall. The opening defines a front side of the housing. Debris may be swept into the housing through the opening. An elongated handle has a first end and a second end. The first end is pivotally coupled to an outer surface of the top wall. A primary light emitter is attached to the housing and emits light forward of the front side of the housing when turned on to illuminate an area forward and adjacent to the bottom wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
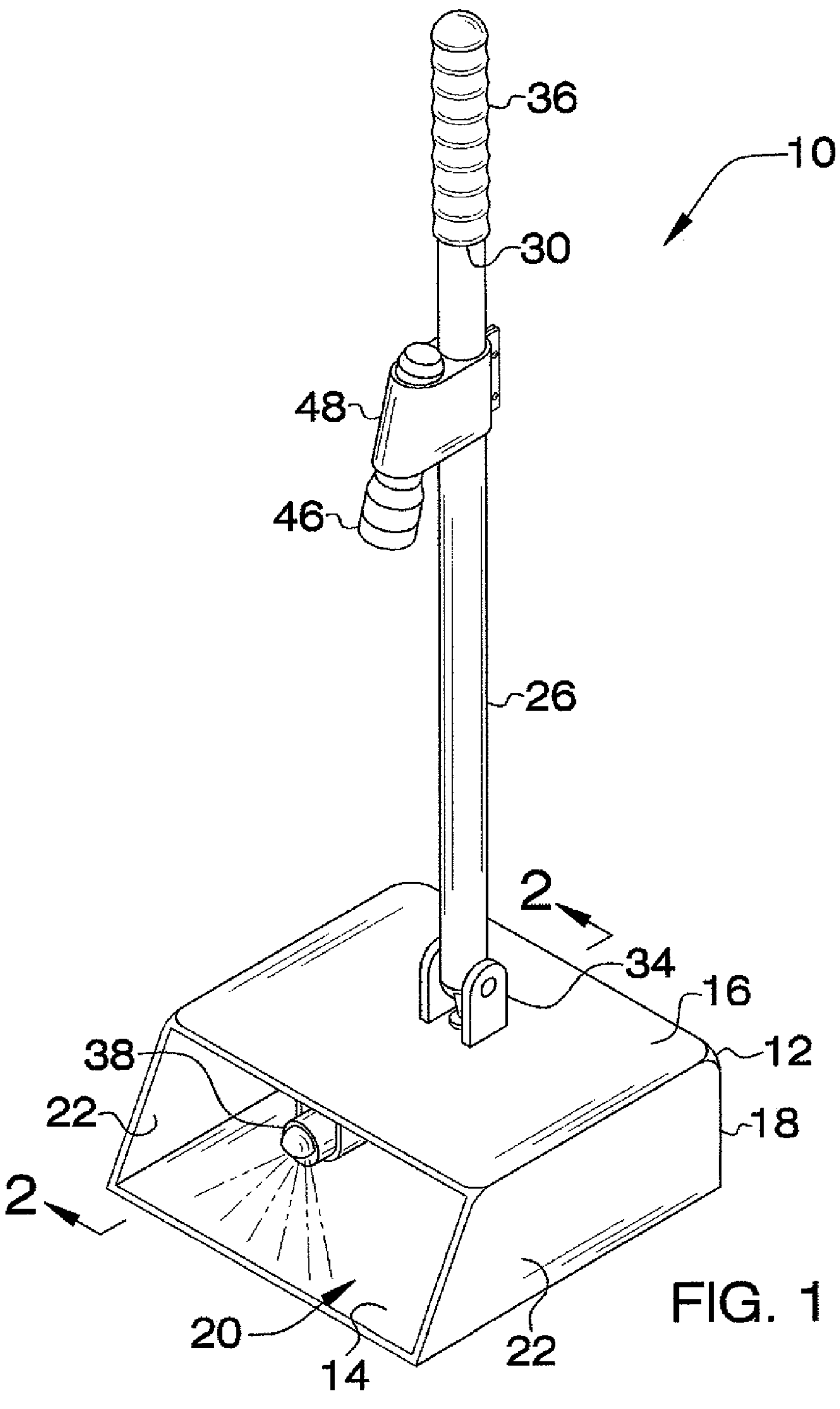
FIG. 1 is a perspective view of a dustbin apparatus according to the present invention.
Figure 2:
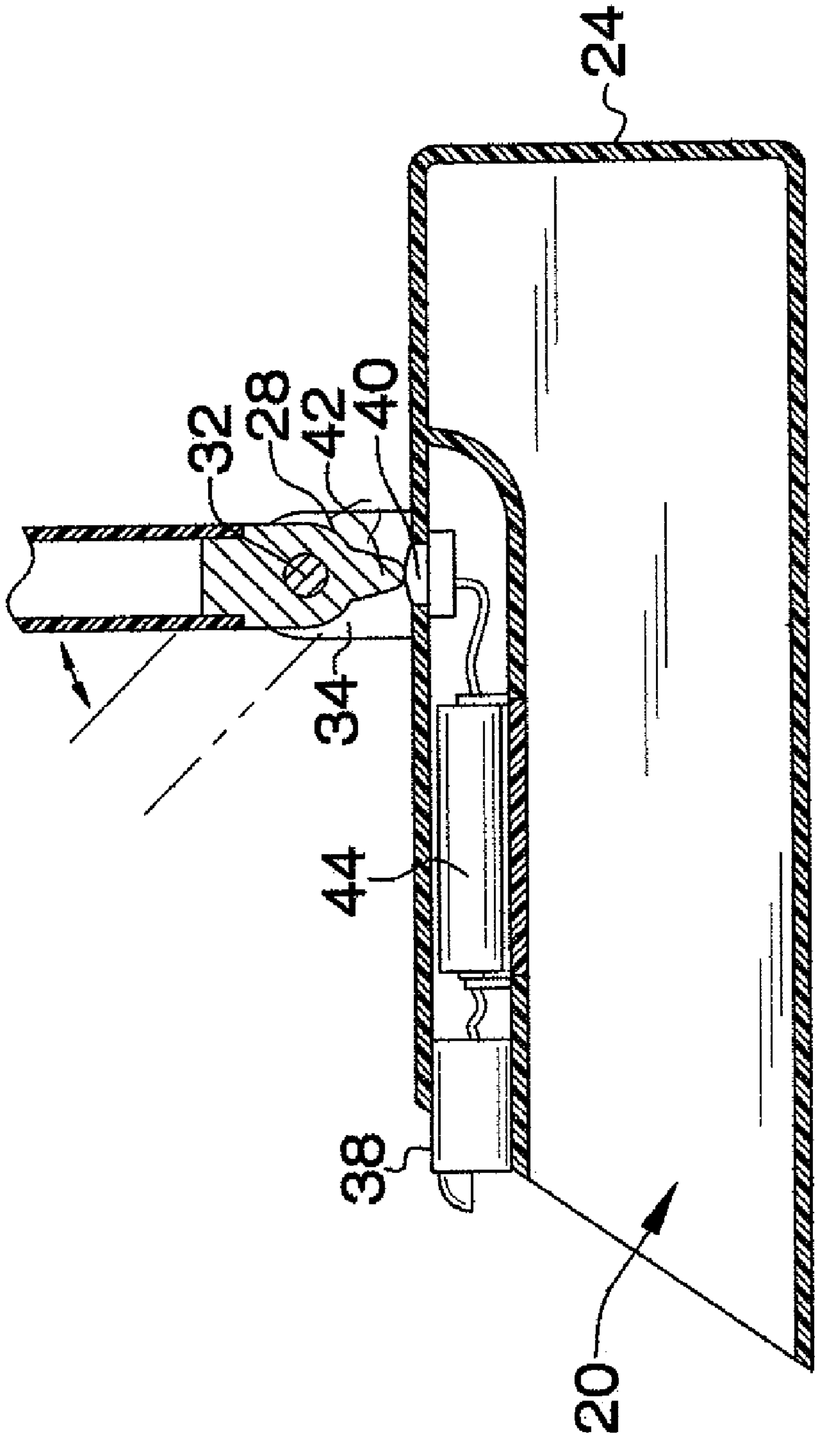
FIG. 2 is a cross-sectional view taken along line 2-2 of FIG. 1 of the present invention.
Figure 3:
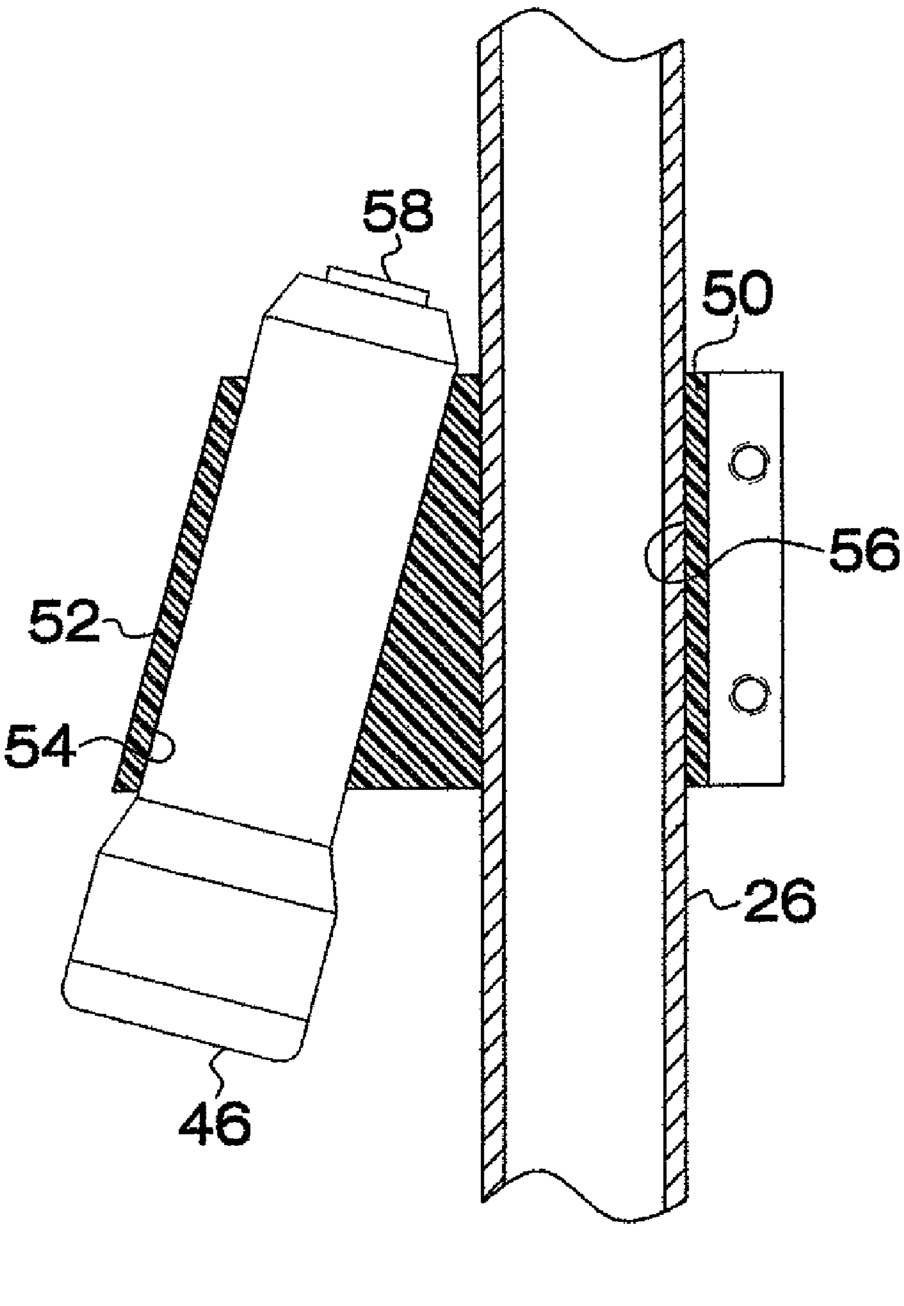
FIG. 3 is a cross-sectional view of a bracket of the present invention.

With reference now to the drawings, and in particular to FIGS. 1 through 3 thereof, a new dustbin device embodying the principles and concepts of the present invention and generally designated by the reference numeral 10 will be described.

As best illustrated in FIGS. 1 through 3, the dustbin apparatus 10 generally comprises a housing 12 having a bottom wall 14, a top wall 16 and a peripheral wall 18 that is attached to and extends between the top 16 and bottom 14 walls. The peripheral wall 18 has an opening 20 therein extending upwardly from the bottom wall 14 and toward the top wall 16. The opening 20 defines a front side of the housing 12. The opening 20 extends across an entire width of the front side. The peripheral wall 18 includes a pair of lateral walls 22 and a back wall 24. The front edges 26 of the lateral walls 22 adjacent to the opening 20 are angled backwardly from the bottom wall 14 to the top 16 wall. Debris may be swept into the housing 12 through the opening 20.

An elongated handle 26 has a first end 28 and a second end 30. The first end 28 is pivotally coupled to an outer surface of the top wall 16 by a pin 32 extending through the handle 26 and attached to a mounting 34 coupled to the top wall 16. A grip 36 is attached to the second end 30 of the handle 26. The handle 26 is positionable between a stored position orientated at an angle less than 45 degrees with respect to the top wall 16 and a deployed position orientated approximately orthogonal to the top wall 16. The housing 12 is preferably weighted and/or the handle 26 positioned so that when the handle 26 is lifted, the housing 12 swings in such a manner that the opening 20 is directed upwardly toward the second end 30 of the handle 26.

A primary light emitter 38 is attached to the housing 12. The primary light emitter 38 emits light forward of the front side, or opening 20, of the housing 12 when the primary light emitter 38 is turned on to illuminate an area forward and adjacent to the bottom wall 14. The primary light emitter 38 is positioned adjacent to the opening 20. The primary light emitter 38 is attached to the top wall and is positioned on an inner surface of the top wall 16. The primary light emitter 38 may comprise a light emitting diode flashlight apparatus and the light emitted therefrom may be directed not only outwardly but also downwardly from the top wall 16.

An actuator 40 is electrically coupled to the primary light emitter 38 to selectively turn the primary light emitter 38 on or off. The actuator 40 is in mechanical communication with the handle 26. The actuator 40 is positioned in an on position and turns the primary light emitter on 40 when the handle 26 is in the deployed position and is positioned in an off position and turns the primary light emitter off 38 when the handle 26 is in the stored position. The actuator 40 is mounted on top wall 16 adjacent to the first end 28 of the handle 26 and is normally extended upwardly from the top wall 16 in an off position. A nub 42 is attached to the first end 28 of the handle 26. The nub 42 engages, or presses downwardly, the actuator 40 when the handle 26 is in the deployed position. A power source 44, such as a conventional battery, is electrically coupled to the actuator 40 and the primary light emitter 38.

A secondary light emitter 46 may also be provided. A bracket 48 is attached to the handle 26 between the first end 28 and the second end 30. The secondary light emitter 46 is removably positioned in the bracket 48 to allow the secondary light emitter 46 to be removed from the bracket 48 and be used as needed as a conventional flashlight. The secondary light emitter 46 directs light away from the second end 28 of the handle 26 and toward the housing 12. The bracket 48 angles the secondary light emitter 46 outwardly from the handle 26. The bracket 48 includes a coupler 50 and a sleeve 52 attached together. The coupler 50 extends around the handle 26 and secures the sleeve 52 to the handle 26. The sleeve 52 has a longitudinal opening 54 orientated at angle between 10 degrees and 45 degrees to a longitudinal opening 56 of the coupler 50. The handle 26 is positioned in the longitudinal opening 56 of the coupler 50 and the secondary light emitter 46 is positioned in the longitudinal opening 54 of the sleeve 52. The sleeve 52 comprises an elastomeric material and frictionally engages the secondary light emitter 46 to hold the secondary light emitter 46 at the angled relationship with respect to the handle 26.

In use, the housing 12 is used as a conventional dustbin wherein debris may be swept off of a floor adjacent to the opening 20 and into the housing 12 through the opening 20. When the handle 26 is moved to the deployed position, it will be extending upwardly from the housing 12 while the bottom wall 14 is resting on the floor. This position will turn on the primary light emitter 38 to illuminate the area in front of the opening 20 to assist a user of the apparatus 10 in seeing the area in front of the housing 12. The secondary light emitter 46 may be used as required to view a wider area around the housing and may be turned on with a switch 58 on the secondary light emitter 46 without extending the handle 26 to the deployed position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dustbin collection assembly comprising:

a housing having a bottom wall, a top wall and a peripheral wall being attached to and extending between said top and bottom walls, said peripheral wall having an opening therein extending upwardly from said bottom wall and toward said top wall, said opening defining a front side of said housing, wherein debris may be swept into said housing through said opening;

an elongated handle having a first end and a second end, said first end being pivotally coupled to an outer surface of said top wall;

a primary light emitter being attached to said housing, said primary light emitter emitting light forward of said front side of said housing when said primary light emitter is turned on to illuminate an area forward and adjacent to said bottom wall; and an actuator being electrically coupled to said primary light emitter to selectively turn said primary light emitter on or off, said handle being positionable between a stored position orientated at an angle less than 45 degrees with respect to said top wall and a deployed position orientated approximately orthogonal to said top wall, said actuator being in mechanical communication with said handle, said actuator being positioned in an on position and turning said primary light emitter on when said handle is in said deployed position, said actuator being positioned in an off position and turning said primary light emitter off when said handle is in said stored position.

2. The assembly according to claim 1, wherein said actuator is mounted on top wall adjacent to said first end of said handle, a nub being attached to said first end of said handle, said nub engaging said actuator when said handle is in said deployed position.

3. The assembly according to claim 1, wherein said primary light emitter is positioned adjacent to said opening.

4. The assembly according to claim 3, wherein said primary light emitter is attached to said top wall.

5. The assembly according to claim 4, wherein said primary light emitter being positioned on an inner surface of said top wall.

6. The assembly according to claim 1, further including:

a secondary light emitter; and a bracket being attached to said handle between said first end and said second end, said secondary light emitter being positioned in said bracket, said secondary light emitter directing light away from said second end of said handle and toward said housing.

7. The assembly according to claim 6, wherein said bracket angles said secondary light emitter outwardly from said handle, said bracket including a coupler and a sleeve attached together, said coupler extending around said handle and securing said sleeve to said handle, said sleeve releasably receiving the secondary light emitter.

8. The assembly according to claim 7, wherein said sleeve has a longitudinal opening orientated at angle between 10 degrees and 45 degrees to a longitudinal opening of said coupler, said handle being positioned in said longitudinal opening of said coupler.

9. The assembly according to claim 8, wherein said sleeve comprises an elastomeric material and frictionally engages said secondary light emitter.

10. A dustbin collection assembly comprising:

a housing having a bottom wall, a top wall and a peripheral wall being attached to and extending between said top and bottom walls, said peripheral wall having an opening therein extending upwardly from said bottom wall and toward said top wall, said opening defining a front side of said housing, wherein debris may be swept into said housing through said opening;

an elongated handle having a first end and a second end, said first end being pivotally coupled to an outer surface of said top wall, a grip being attached to said second end of said handle, said handle being positionable between a stored position orientated at an angle less than 45 degrees with respect to said top wall and a deployed position orientated approximately orthogonal to said top wall;

a primary light emitter being attached to said housing, said primary light emitter emitting light forward of said front side of said housing when said primary light emitter is turned on to illuminate an area forward and adjacent to said bottom wall, said primary light emitter being positioned adjacent to said opening, said primary light emitter being attached to said top wall, said primary light emitter being positioned on an inner surface of said top wall;

an actuator being electrically coupled to said primary light emitter to selectively turn said primary light emitter on or off, said actuator being in mechanical communication with said handle, said actuator being positioned in an on position and turning said primary light emitter on when said handle is in said deployed position, said actuator being positioned in an off position and turning said primary light emitter off when said handle is in said stored position, said actuator being mounted on top wall adjacent to said first end of said handle, a nub being attached to said first end of said handle, said nub engaging said actuator when said handle is in said deployed position;

a secondary light emitter; and a bracket being attached to said handle between said first end and said second end, said secondary light emitter being positioned in said bracket, said secondary light emitter directing light away from said second end of said handle and toward said housing, said bracket angling said secondary light emitter outwardly from said handle, said bracket including a coupler and a sleeve attached together, said coupler extending around said handle and securing said sleeve to said handle, said sleeve having a longitudinal opening orientated at angle between 10 degrees and 45 degrees to a longitudinal opening of said coupler, said handle being positioned in said longitudinal opening of said coupler, said sleeve comprising an elastomeric material and frictionally engaging said secondary light emitter.

* * * * *